(12) United States Patent
Najima

(10) Patent No.: US 6,310,465 B2
(45) Date of Patent: Oct. 30, 2001

(54) BATTERY CHARGING DEVICE

(75) Inventor: Kazuki Najima, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/726,925

(22) Filed: Nov. 30, 2000

(30) Foreign Application Priority Data

Dec. 1, 1999 (JP) .................................................. 11-342377

(51) Int. Cl.[7] ....................................................... H02J 7/04
(52) U.S. Cl. ........................................... 320/150; 320/108
(58) Field of Search ..................................... 320/108, 150; 336/DIG. 2

(56) References Cited

U.S. PATENT DOCUMENTS 5,412,304 * 5/1995 Abbott .................................. 320/108
5,594,315 * 1/1997 Ramos et al. ........................ 320/108

FOREIGN PATENT DOCUMENTS 9-103037    4/1997 (JP) .

* cited by examiner

Primary Examiner—Peter S. Wong
Assistant Examiner—Gregory J Toatley, Jr.
(74) Attorney, Agent, or Firm—Morgan & Finnegan, LLP

(57) ABSTRACT

A battery charging device includes a power supply coupler and a power receiver coupler. The power supply coupler includes a primary coil, a communication unit to communicate the power receiver coupler, a thermistor for detecting the temperature of the power supply coupler, and a communication interruption circuit for interrupting a communication signal when the predetermined value is detected by the thermistor. When the temperature of the power supply coupler exceeds the predetermined value, a signal is produced by the communication interruption circuit to prevent an excessive temperature rise in the power supply coupler. The signal may, for example, stop the supply of electric power to the power supply couple.

12 Claims, 7 Drawing Sheets

Fig.6

Output Of Communication Interruption Circuit24 When The Temperature Of The Power Supply Coupler Is Below The Predetermined Temperature Output Of Communication Interruption Circuit24 When The Temperature Of The Power Supply Coupler Exceed The Predetermined Temperature Output Of Communication Interruption Circuit24 When The Temperature Of The Power Supply Coupler Is Below The Predetermined Temperature And When Communication Is Interrupted

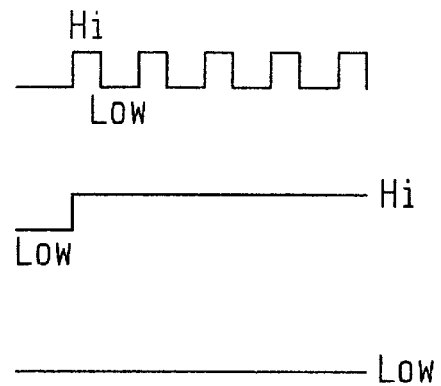

Fig.7

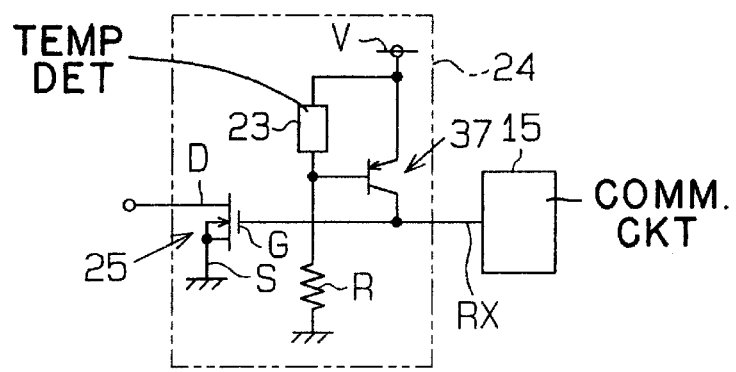

BATTERY CHARGING DEVICE

BACKGROUND OF THE INVENTION

This invention relates to battery charging device and, more particularly, to an electromagnetic induction, non-contact type battery charging device suited for charging batteries of a self-propelled apparatus such as electric vehicles.

In conventional battery charging devices, there are two types of charging systems, namely, conductive charging device and an inductive charging device. The inductive charging device is also called an electromagnetic, non-contact type battery charging device. The inductive charging device is advantageous in that it cannot be hindered by a bad electrical contact unlike the conductive charging device. Further, with the use of the inductive charging device, vehicles are not required to carry large battery charging equipment, and the size of the battery charging device can be reduced.

Charging of the battery is usually achieved by inserting a power supply coupler connected to a power supply device with a cable into a power receiver coupler mounted within the electric vehicle. When the couplers are coupled to one another, the couplers transmit or receive information necessary for setting charging conditions by means of respective internal communication units.

In the prior art battery charging device discussed above, the charging of the battery is done at high frequency and at high rates, there is a great deal of heat buildup in the power supply charging coupler. In order to prevent the power supply coupler from being damaged due to thermal shock, it is a usual practice to have the power receiver coupler equipped with a cooling unit of an air type or a water type. The power receiver coupler is also equipped with a temperature sensor, which serves to monitor the operating temperature of the power receiver coupler during charging and to transmit a temperature signal related to the detected temperature to a control unit of the power supply device via the communication unit of the power supply coupler. When the battery charger overheats, the control unit of the power supply device serves to stop the charging of the battery in response to the temperature signal delivered from the temperature sensor.

However, even when such thermal protection is carried out, if there is a failure in the communication system, it is difficult to prevent a decrease in cooling performance or an abnormal operating condition of the power supply coupler.

In the prior art battery charging device as discussed above, the cooling performance and overheating is usually detected by a detector incorporated in the power receiver coupler. For this reason, if the temperature of the power supply coupler is excessive and the temperature of the power receiver coupler is not excessive, charging of the battery continues. As the charging of the battery continues, the temperature of the power supply coupler further increases, which may cause unstable operation of the communication units and cause difficulties in achieving a stable charging of the battery. In addition, the power supply coupler is subject to thermal distortion and various component parts incorporated in the power supply coupler are subject to thermal cracking.

SUMMARY OF THE INVENTION

It is therefore an object of the present invention to provide a battery charging device which is highly reliable.

In order to meet the above and other objects, the present invention provides a battery charging device.

The battery charging device has a power supply coupler connected to a power supply device, and a power receiver coupler into which the power supply coupler is adapted to be inserted for charging a battery of an electric vehicle. The power supply coupler has components, which include a first core, a primary coil located around the first core and supplied with electric power from the power supply device, and a case accommodating the first core and the primary coil. The power receiver coupler includes a second core that forms a magnetic path with the first core when the power supply coupler is coupled to the power receiver coupler, a secondary coil located around the second core, and a case accommodating the second core and the secondary coil. The power supply device is connected to the primary coil. The battery is connected to the secondary coil and is charged with an electric current generated in the secondary coil when the electric power is supplied to the primary coil. The power supply coupler includes a temperature detector for detecting the temperature of the power supply coupler to generate an electrical signal that is used to avoid avoiding an excessive temperature in the components of the power supply coupler.

The present invention further provides a battery charging device. The battery charging device has a power supply coupler including a first core, a primary coil located around the first core and connected to receive electric power from a power supply device, and a case accommodating the first core and the primary coil. The power receiver coupler includes a second core that forms a magnetic path with the first core of the power supply coupler when it is coupled to the power receiver coupler, a secondary coil located around the second core, and a case accommodating the second core and the secondary coil. The power supply device supplies an electric current to the primary coil. The battery is connected to the secondary coil and is charged with an electric current generated in the second coil when the electric power is supplied to the primary coil. The power receiver coupler includes a first communication unit for transmitting a first electric signal, which includes information related to the charging state of the battery, to the power supply coupler. The power supply coupler includes a second communication unit for receiving the first electric signal and transmitting the same as a second electric signal to the power supply device; temperature detector for generating a third electric signal indicating the temperature of the power supply coupler; and a communication interruption circuit connected to the temperature detector for receiving the third electric signal. The communication interruption circuit interrupts when the third electric signal exceeds a predetermined value. The power supply device includes a control unit for controlling the electric power supplied to the primary coil on the basis of the second electric signal.

The present invention also provides a power supply coupler for a battery charging device which is connected to a power supply device having a control unit and which has a power receiver coupler mounted in an electric vehicle for a battery located in the vehicle. The power receiver coupler has a core and a secondary coil located around the core and connected to the battery.

The power supply coupler has a core and a primary coil located around the core. The core of the power supply device forms a magnetic path with the core of the power receiver coupler. The primary coil induces an electric current in the secondary coil when an electric power is supplied to the primary coil. The power supply coupler also has a temperature detector, which detects the temperature of the power supply coupler to generate an electric signal when the temperature of the power supply coupler exceeds a predetermined value. The power supply device has a control unit responsive to the electric signal for controlling the electric power to be supplied to the primary coil.

Other aspects and advantages of the invention will become more apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings, in which:

FIG. 6 is a view illustrating various signals used in the communication unit of the power supply coupler and the communication interruption circuit;

FIG. 7 is a circuit diagram of another preferred embodiment of communication interruption circuit;

DETAILED DESCRIPTION OF THE PREFERRED EMBODIMENTS

A preferred embodiment of a battery charging device according to the present invention will now be described below in detail with reference to the drawings as applied to an electric vehicle.

Figure 1:
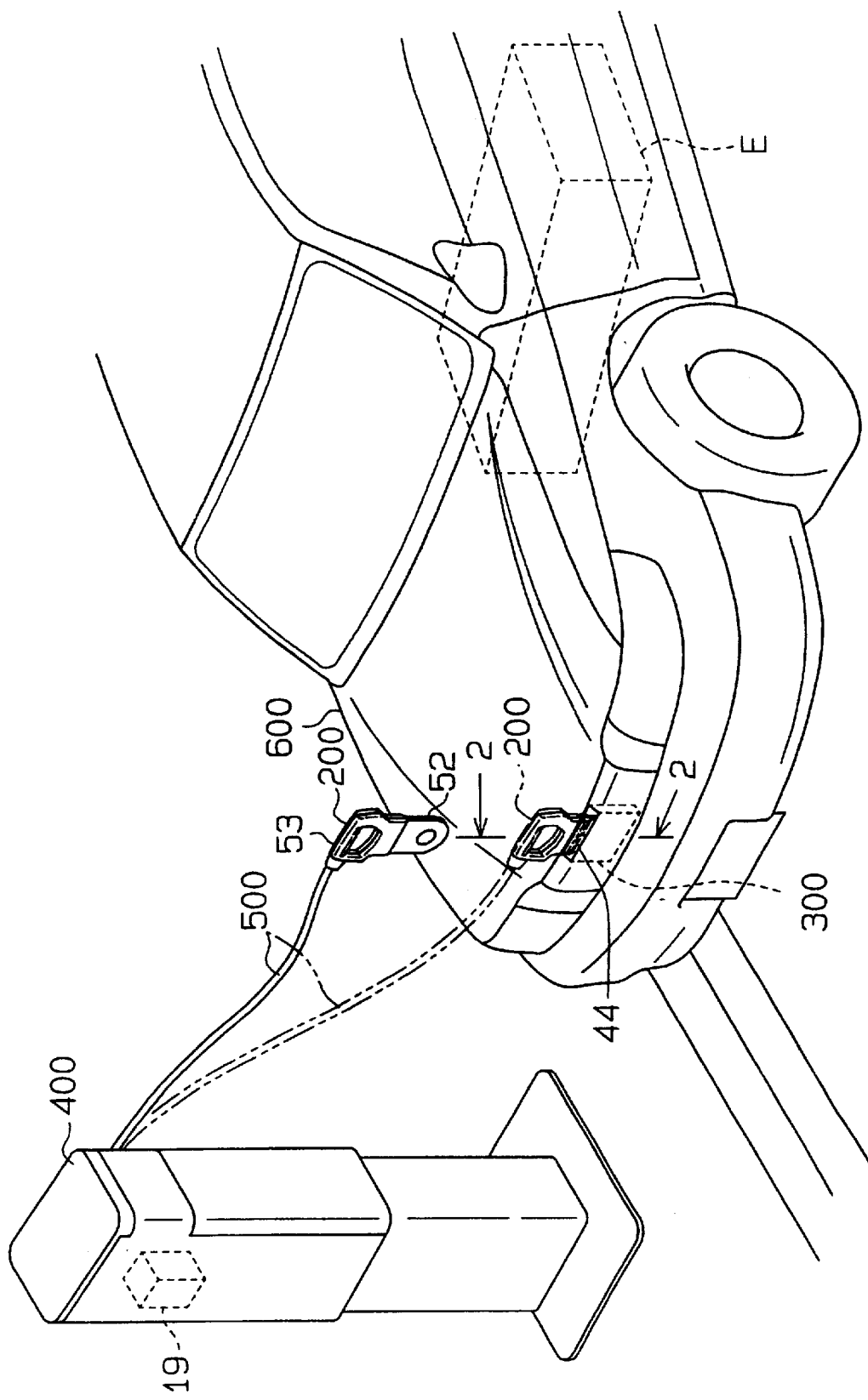
FIG. 1 is a schematic view illustrating the whole structure of a battery charging device according to the present invention.

In FIG. 1, the electric vehicle is assigned with a reference numeral 600. The electric vehicle 600 has an electric motor (not shown) and a battery E connected to the electric motor (not shown). The electric motor serves as a prime mover powered by the battery E and constitutes an essential part of a drive system of the electric vehicle 600.

The battery charging device includes a power supply device 400, a power supply coupler 200 and a power receiver coupler 300. The power supply device 400 is normally located at a battery charging service station. The power supply coupler 200 is connected to the power supply device 400 by a cable 500. The power receiver coupler 300 and its associated parts are incorporated in the electric vehicle 600. In this instance, the power receiver coupler 300 is mounted at a front part of the vehicle 600.

Charging of the battery E is achieved by inserting the power supply coupler 200 into the power receiver coupler 300. If the power supply coupler 200 is coupled to the power receiver coupler 300, the power supply device 400 supplies an electric power to the power supply coupler 200. Consequently, the power receiver coupler 300 receives electric power from the power supply coupler 200 to charge the battery E.

Figure 3:
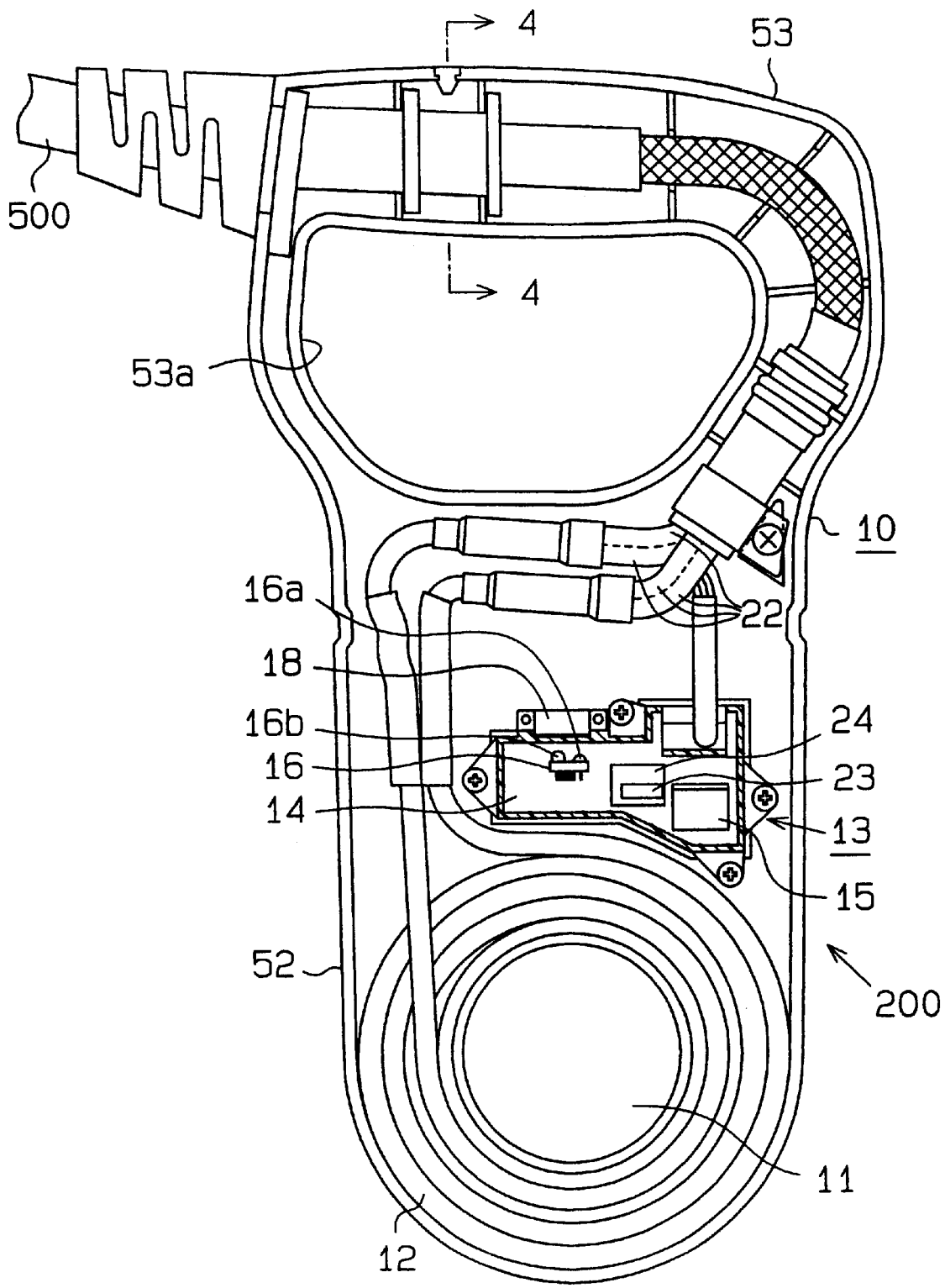
FIG. 3 is a front view of the power supply coupler having a casing, a portion of which is omitted.

As clearly shown in FIG. 3, the power supply coupler 200 comprises a case 10. The case 10 includes an inserter portion 52, which fits into the power receiver coupler 300, and a handle or grip portion 53, which is gripped by a worker at the battery charging service station. The inserter portion 52 has a paddle shape which is designed to be inserted into or to be removed from the power receiver coupler 300. Further, the inserter portion 52 has front and rear portions which are configured to have the same shape to permit the insertion of the power supply coupler 200 into the power receiver coupler 300 in either of two orientations. The grip portion 53 has a plate-like shape in which an aperture 53a is formed to allow gripping by the worker.

The inserter portion 52 is hollow. The distal end portion of the inserter portion 52 has a first cylindrical core 11 made of ferrite material and a primary coil 12 wound around the first core 11.

Figure 2:
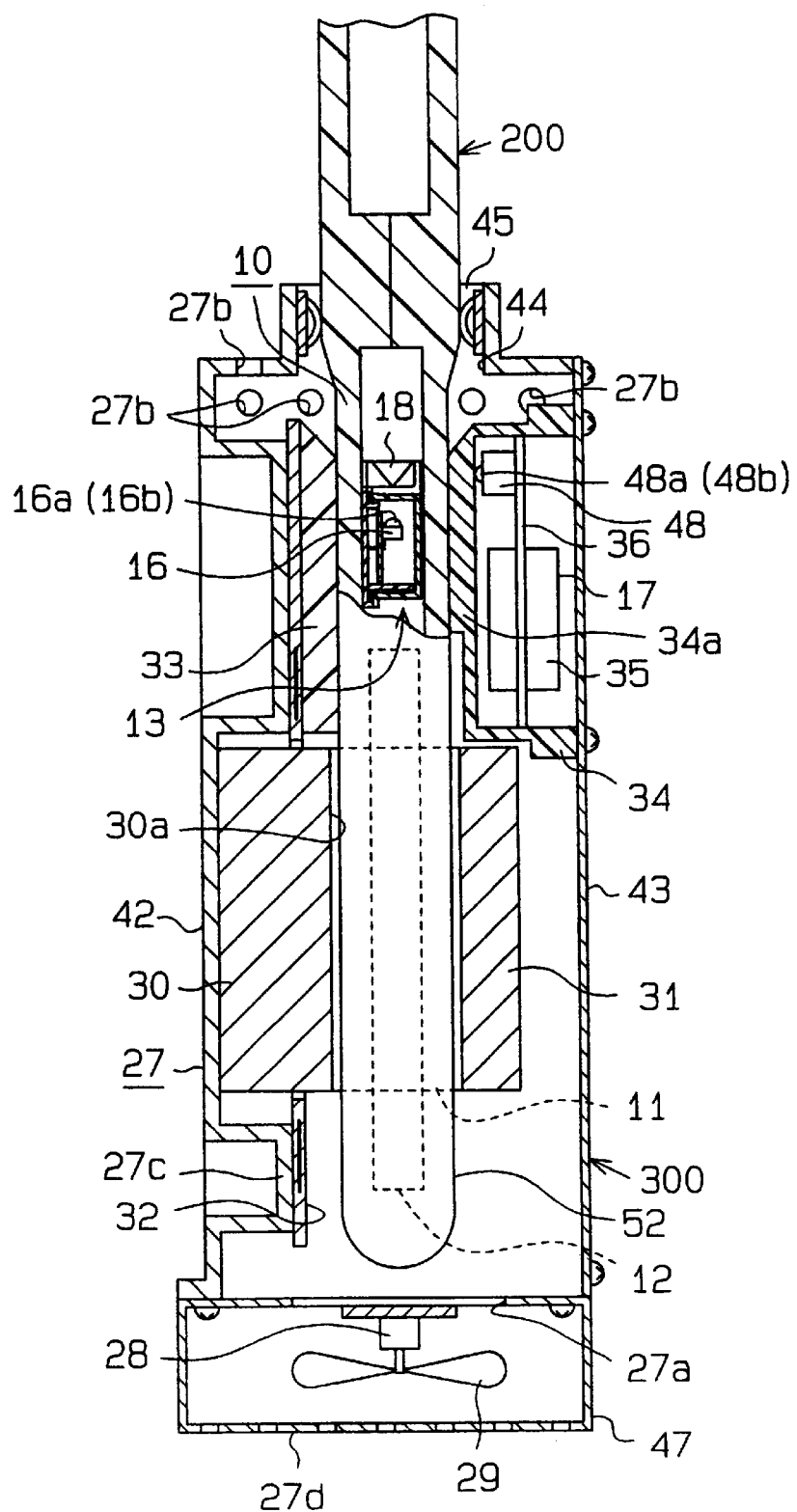
FIG. 2 is a cross sectional view of a power supply coupler and a power receiver coupler taken on line 2—2 of FIG. 1.

As clearly shown in FIG. 2, the power receiver coupler 300 has a case 27. The case 27 has a hollow body 42, the rear and bottom sides of which are opened, and a cover plate 43, which is fixed to the rear side of the hollow body 42 by fasteners such as screws. The hollow body 42 has an upper wall 44, in which a coupler inserter port 45 is formed, and a side wall, in which a plurality of apertures 27b are formed to permit outside air to enter. Also, the lower end of the case 27 has a motor fan. The motor fan includes a motor 28, a fan 29, which driven by the motor 28, and a housing 47, which envelopes the motor 28 and the fan 29. The housing 47 has upper and bottom walls, in which an opening and a plurality of small bores 27d are formed, respectively. The motor fan is secured to an upper wall of the housing 47, which is fixed to a lower end of the case 27 by fasteners such as screws to align the opening 27a with a lower opening of the casing 27. The power receiver coupler 300 is fixed at the front part of the electric vehicle 600 such that the coupler inserter port 45 faces upward.

The lower portion of the case 27 has a second core, which includes a first core member 30 and a second core member 31, both of which are made of ferrite material. The first core member 30 is designed to have a substantially E-shaped configuration, a cylindrical center magnetic pole 30a, and a magnet pole at each side of the center magnetic pole. The second core member 31 is designed to have a substantially plate-like configuration. The second core member 31 is attached to the first core member 30 such that it spans the magnetic poles of the second core member 31 and forms a magnetic path. A secondary coil 32 is located around the second core 30 and is formed circuit boards formed into a one piece coil board. The coil board has a center bore, which receives the center magnetic pole 30a of the first core member 30, and is located in the body 42 between the first and second core members 30 and 31 and is fixed in place by a support pedestal 27c of the case 27.

The upper portion of the case 27 houses a guide plate 33 and an auxiliary member 34. The guide plate 33 is located between the coil board forming the secondary coil 32 and the case 10 of the power supply coupler 200 and is fixed to the case 27. The auxiliary member 34 is located between the cover plate 43 and the case 10 of the power supply coupler 200 and has an opening that faces the cover plate 43. Also, the wall defining the opening is fixed to the cover plate 43 by fasteners such as screws.

The guide plate 33 has an inner surface that faces the case 10 of the power supply coupler 200, and a plurality of projections are formed on the inner surface. Likewise, the auxiliary member 34 has an inner surface that faces the case 10 of the power supply coupler 200, and a plurality of projections 34a are formed on the inner surface. The projections 34a are elongated and extended along a longitudinal axis of the power supply coupler 200. The projections 34a are parallel to each other and lie on a plane perpendicular to the plane of the sheet of FIG. 2. The guide plate 33 has the same kind of projections. The protrusions 34a support the case 10 of the power supply coupler 200 and guide the power supply coupler 200 when it is inserted into the power receiver coupler 300.

The power receiver coupler 300 includes a communication unit 17, which has a communication circuit 35 and a light emitter-receiver element 48. The communication circuit 35 and the light emitter-light receiver element 48 are mounted on a circuit board 36. The circuit board 36 is fixed within the auxiliary member 34. The light emitter-light receiver element 48 has a light emitter section 48a for emitting infrared light, and a light receiver section 48b for receiving infrared light.

The power supply coupler 200 also includes a communication unit 13. As shown in FIGS. 2 and 3, the communication unit 13 includes a communication circuit 15, and a light emitter-light receiver element 16. The communication unit 15 and the light emitter-light receiver element 16 are mounted on a circuit board 14, which is located in the inserting portion 52 of the case 10 at a position close to an edge of the aperture 53a and is fixed to the case 10. The light emitter-light receiver element 16 includes a light emitter section 16a for emitting infrared light and a light receiver section 16b for receiving infrared light. A reflector 18 is mounted on the circuit board 14.

The light emitter-light receiver elements 16 and 48 and the reflector 18 are located in the case 10 such that the infrared light emitted from the light emitter section 48a of the light emitter-light receiver element 48 enters the light receiver section 16b of the light emitter-light receiver element 16 via the reflector 18, and the infrared light emitted from the light emitter section 16a of the light emitter-light receiver element 16 enters the light receiver section 48b of the light emitter-light receiver element 48. The reflector 18 is mounted on the circuit board 14 to direct the infrared light emitted from the light emitter section 48a precisely to the light receiver section 16b in either of the two possible orientations of the power supply coupler 200. In other words, the power supply coupler 200 can be reversed in the power supply coupler 200, and the infrared light will be properly transmitted and received. To transmit the infrared light, the auxiliary member 34 is made of an electrical insulation material that transmits infrared light. The case 10 also has portions made of the same electrical insulation material at locations adjacent to the reflector 18 to transmit the infrared light.

The communication unit 15 is connected to the light emitter-light receiver element 16 and the control unit 19 of the power supply device 400. The communication circuit 35 of the power receiver coupler 300 is connected to the light emitter-light receiver element 48 and the sensor located at the battery E. The communication circuit 35 produces an information signal indicating the battery voltage and the temperature of a battery liquid or electrolyte, in response to signals from the battery sensor. As already noted above, the information signal is transmitted through the light emitter-light receiver element 48, the reflector 18 and the light emitter -light receiver element 16 to the communication circuit 15, which delivers the information signal to the control unit 19 of the power supply device.

Figure 4:
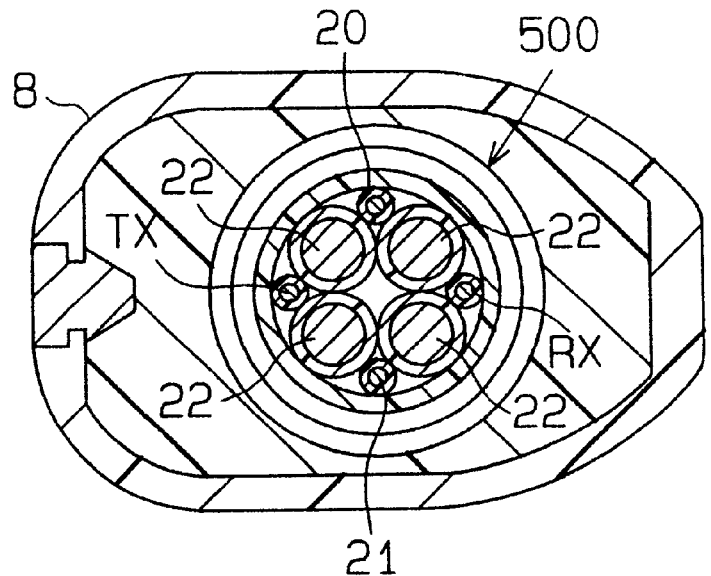
FIG. 4 is a transverse cross sectional view of a cable taken on line 4—4 of FIG. 3.

FIG. 4 shows a cross sectional view of the cable 500 which connects the power supply coupler 200 to the power supply device 400. The cable 500 includes a power supply wire 20, a ground wire 21, a transmission wire TX, a receiver wire RX, and four power wires 22. The power wires 22 contact each other. The power wires 22 are connected between the primary coil 12 of the power supply coupler 200 and the power supply device 400 and supply electric power to the primary coil 12. The transmission wire TX, the receiver wire RX, the power wire 20 and the ground wire 21 are connected between the control unit 19 and the communication unit 13. The transmission wire TX transmits the information signal, which represents the various information discussed above, to the communication unit 13. The receiver wire RX transmits the information transmitted from the communication unit 17 to the control unit 19 via the communication unit 13. As shown in FIG. 3, the wires 20, 21, TX and RX are led from the cable 500 within the power supply coupler 200 and are connected to the communication unit 13 via connectors of the circuit board 14.

As seen in FIG. 1, charging of the battery E is started at the charging service station by the worker by inserting the power supply coupler 200 into the power receiver coupler 300.

As seen in FIG. 2, when the power supply coupler 200 is inserted into the power receiver coupler 300, the first core 11 of the power supply coupler 200 is brought into axial alignment with the center magnetic pole 30a of the power receiver coupler, the first and second cores are magnetically coupled to each other, and the primary and secondary coils are electrically coupled in a non-contact condition. During the coupling step, an alternating current is supplied to the primary coil 12 of the power supply coupler 200 via the power wire 22 of the cable 500. In this instance, an electric current is generated in the secondary coil 32 of the power receiver coupler 300 due to electromagnetic induction. This current is converted into a D.C. current and delivered to the battery E of the electric vehicle 600 for charging.

During battery charging, the communication unit 35 of the power receiver coupler 300 generates a first digital signal which indicates, for example, the output voltage of the battery E and the temperature of the battery liquid in response to the output signal delivered from the battery sensor of the battery E. The light emitter-light receiver element 48 produces an infrared signal from the light emitter section 48a in response to the first digital signal. The infrared signal is transmitted through the reflector 18 of the power supply coupler 200 to the light receiver section 16a and the infrared signal is converted to the information signal, which is supplied to the communication circuit 15. The communication circuit 15 produces a second digital signal, which is supplied to the control unit 19 of the power supply device 400, through the transmission wire TX of the cable 500 in response to the information signal. The control unit 19 includes a microprocessor, which determines the magnitude of the alternating current to be supplied to the primary coil 12 of the power supply coupler 200 in accordance with the second digital signal, which carries the information from the communication unit 17 indicating the battery voltage and the temperature of the battery liquid. The microprocessor also serves to monitor the above information during the battery charging and supplies the electric power to the primary coil 12.

During the battery charging, there is a great deal of heat buildup in the primary and secondary coils 12 and 32. However, the coils 12 and 32 are cooled by an air stream flowing through the case 27. When the power supply coupler 200 is coupled to the power receiver coupler 300, the fan 29 shown in FIG. 2 starts to rotate, which draws outside air to the inside of the case 27 through the apertures 27b. The air flows through the recesses formed between the projections of the guide plate 33 and the projections 34a of the auxiliary member 34 and is forced out from the case 27 by the fan 29. The primary coil 12 and the second core formed by the core members 30 and 31 are cooled by the air stream flowing through the case 27. Further, the secondary coil 32 of the power supply coupler 300, the first core 11 and the case 10 are also cooled by the air stream.

If the temperature of the power supply coupler 200 increases beyond a given level due to drop in the power of the fan 29 or some other failure, the battery charging device of the present invention stops the supply of electric power to the primary coil 12 of the power supply coupler 200, which prevents overheating of the power supply coupler 200 and the power receiver coupler 300.

In order to achieve this, a temperature detector 23, which includes, for example, a thermistor, is mounted on the circuit board 14 as shown in FIG. 3. A communication interruption circuit 24 is also mounted on the circuit board 14. The communication interruption circuit 24 input and output terminals connected to the communication circuit 15 and the control unit 19, respectively.

The thermistor 23 is a positive characteristic type thermistor, in which its resistance increases with an increase in temperature. The communication interruption circuit 24 is responsive to a temperature signal delivered from the thermistor 23. If the temperature signal exceeds a predetermined level, the interruption circuit 24 interrupts the communication signal supplied to the control unit 19 from the communication unit 13. The predetermined temperature is set to a value to prevent the overheating of the power supply coupler 200. More specifically, this temperature has is chosen to prevent the thermal distortion of the case 10 of the power supply coupler 200 or thermal damage to the various component parts incorporated in the power supply coupler 200.

Figure 5:
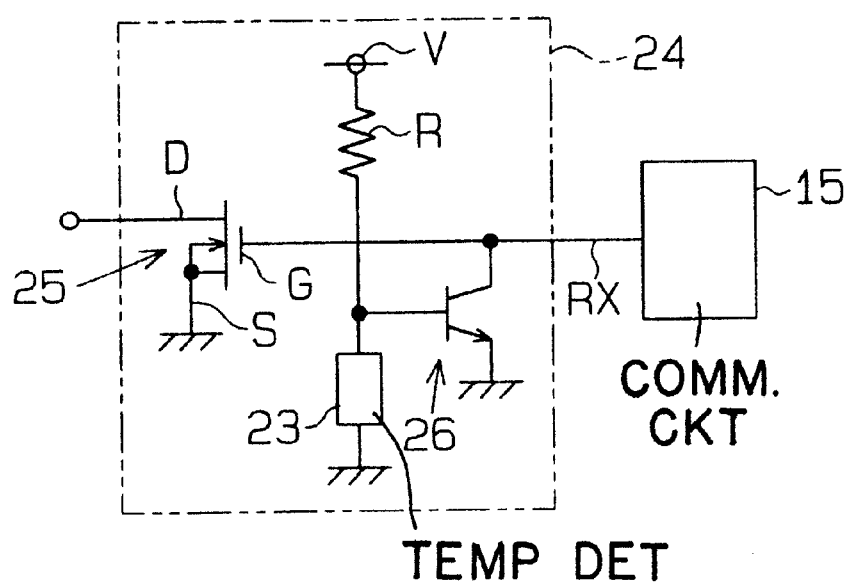
FIG. 5 is a circuit diagram of a preferred embodiment of a communication interruption circuit incorporated in the power supply coupler of the battery charger according to the present invention.

As shown in FIG. 5, the communication interruption circuit 24 includes a N-channel MOSFET 25, a NPN type transistor 26, and a resistor R. The gate G of the MOSFET 25 is connected to the communication circuit 15, the source S is connected to ground, and the drain D is connected to the control unit 19 of the power supply device 400 via the transmission wire TX. The collector of the transistor 26 is connected between the gate of the MOSFET 25 and the communication circuit 15, the emitter is connected to the ground, and the base is connected to ground via the thermistor 23 and is also connected to a power source V via a resistor R.

In the battery charging device according to the present invention, the communication circuit 15 is designed to continuously produce a Hi signal when the communication of the signals is interrupted. The output of the MOSFET 25 is Low when the gate G receives an ON signal and is Hi when the gate G receives an OFF signal.

During battery charging, the communication circuit 35 of the power receiver coupler 300 produces the first digital signal, which is applied through-light emitter and light receiver element 48 and the light emitter-light receiver element 16 to the communication circuit 15. The communication circuit 15 transmits the second digital signal to the control unit 19 of the power supply device 400. The second digital signal includes a pulse signal indicated by the uppermost waveform in FIG. 6.

During the battery charging, the temperature of the power supply coupler 200 is continuously detected by the thermistor 23. The electrical resistance of the thermistor 23 increases when the temperature of the inside of the power supply coupler 200 increases. More specifically, the electrical resistance of the thermistor 23 increases as the temperature of the air surrounding the thermistor 23 increases.

If the resistance of the thermistor 23 is below a given value, which represents the predetermined temperature, the base potential of the transistor 26 is maintained at a level that turns on the transistor 26. For this reason, the MOSFET 25 generates an output signal corresponding to the second digital signal, which is delivered from the communication circuit 15. The output signal of the MOSFET 25 is sent to the control unit 19.Therefore, the transistor 26 does not affect the output signal transmitted to the control unit 19 via the communication unit 13 from the communication unit 17.

If the battery information signal is not transmitted from the communication circuit 35 through the communication circuit 15, the transistor 26 is held in its off state, and the MOSFET 25 is held in its on state. Then, the output of the communication unit 24 is low as shown by the lowermost waveform in FIG. 6.

If the resistance of the thermistor 23 exceeds the given level, the base potential of the transistor 26 increases, and the transistor 26 is turned on. When this occurs, the output signal of the communication circuit 15 is caused to flow to the emitter of the transistor 26. Therefore, the gate G of the MOSFET 25 goes to a low level (The MOSFET 25 is turned off). Under these circumstances, the outputs of the MOSFET 25 or the communication circuit 24 goes to high level regardless of the presence or the absence of the signal from the communication circuit 15, as shown by a middle waveform in FIG. 6. This condition continues until the resistance of the thermistor 23 decreases to a value to turn on the MOSFET 26.

The control unit 19 responds to a low level output of the communication interruption circuit 24 supplying electric power to the primary coil 12 of the power supply charging coupler 200 according to the information indicating the battery condition transmitted from the communication unit 17 via the communication unit 13. If, on the contrary, the communication circuit 24 continues to produce a high level output, namely, when the temperature of the power supply coupler 200 exceeds the predetermined temperature, the control unit 19 stops the supply of electric power to the primary coil 12.

The battery charging device according to the present invention has the following advantages.

(1) The casing 10 enclosing the primary coil 12 of the power supply charging coupler 200 is internally provided with the temperature detector 23 for detecting an increase in the temperature of the power supply charging coupler 200 beyond the predetermined level. The temperature detector 23 detects whether the temperature of the power supply coupler 200 exceeds or is below the predetermined level. It is possible to take a step such as stopping the charging of the battery, on the basis of the result of the temperature detector 23 to prevent an excessive temperature increase in the power supply charging coupler 200. As a result, overheating of the power supply coupler 200 is prevented, and thermal distortion or thermal damage to the components of the power supply coupler 200 is effectively and reliably prevented.

(2) When the temperature detector 23 detects that the temperature of the power supply coupler 200 exceeds the predetermined level and produces an output signal to that effect, the communication interruption circuit 24 interrupts the information signal for battery charging control from being supplied to the control unit 19 from the communication circuit 15. With the provision of the communication interruption circuit 24, the number of communication wires between the communication interruption circuit 24 and the power supply coupler 200 and between the power supply coupler 200 and the control unit 19 of the power supply device 400 is minimized.

(3) The communication unit 13 continues to produce the Hi level output signal when the communication is interrupted, and the communication interruption circuit 24 provides a Hi level output signal when the temperature of the power supply coupler 200 exceeds the predetermined level. For this reason, the control unit 19 can easily discriminate between a failure in the communication system and an abnormal temperature increase, thus it is possible to take a step such as to stopping the supply of the electric power to the power supply coupler 200 or a step of continuing to supply electric power upon modification of various charging conditions. For example, if communication is interrupted just before the completion of charging, further continuous charging of the battery may be deemed safe and charging may be continued.

(4) The power supply charging coupler of the battery charger of the electric vehicle is frequently subjected to vibrations, acceleration and heat. Since, however, overheating of and damage to the power supply coupler 200 is reliably prevented, the battery charging device is very reliable.

It should be apparent to those skilled in the art that the present invention may be embodied in may other specific forms without departing from the spirit or scope of the invention. Particularly, it should be understood that the invention may be embodied in the following forms.

While, in the battery charging device of the preferred embodiment discussed above, the communication interruption circuit 24 has been described as having the MOSFET 25 that provides a Hi level output signal when the resistance value of the thermistor 23 exceeds a value corresponding to the predetermined temperature, it may be modified such that the MOSFET 25 produce a Low level output signal when the resistance of the thermistor 23 exceeds a value corresponding to the predetermined temperature.

FIG. 7 shows an example of a communication interruption circuit 24 employing such a MOSFET. In FIG. 7, the communication interruption circuit 24 includes a transistor 37, which is a NPN type, and its collector is connected to a junction between the MOSFET 25 and the communication circuit 15, its emitter is connected to the power supply V, and its base connected to ground via the resistor R and to the power supply V via the thermistor 23.

In the communication interruption circuit 24 discussed above, if the resistance of the thermistor 23 is below a value corresponding to the predetermined temperature, the transistor 37 is maintained in its off state. If, on the contrary, the resistance of the thermistor 23 exceeds a value corresponding to the predetermined temperature, the transistor 37 is turned on. When the transistor 37 is turned on, the output of the transistor 37 goes to the Hi level regardless of the output signal being produced by the communication circuit 15. Therefore, the MOSFET 25 is turned on and produces a low level output signal. The control unit 19 responds to the Low level output signal (the communication signal) by stopping the charging of the battery. Since, in this instance, the MOSFET 25 produces a Low level signal when the communication circuit 15 is stopped and when temperature in the power supply charging coupler is excessive, it is difficult for the control unit 19 to make a judgment, but this embodiment has the advantages (1), (2) and (4).

Further, another modification is made in which, when the communication circuit 15 stops communication, the communication circuit 15 continuously produces a Low level signal, which enables the MOSFET 25 to be omitted.

Figure 8:
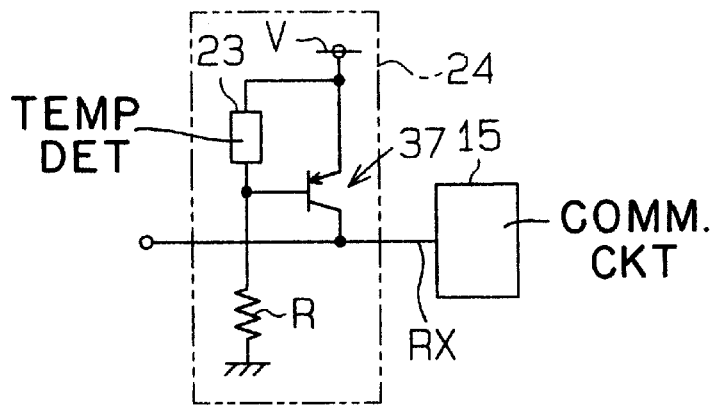
FIG. 8 is a circuit diagram of another preferred embodiment of a communication interruption circuit.

FIG. 8 shows a preferred example of such a communication interruption circuit 24. In the communication interruption circuit 24 of FIG. 8, the MOSFET 25 shown in FIG. 7 is omitted. When communication is stopped, the communication circuit 15 produces a Low level signal. If, in this instance, the resistance of the thermistor 23 exceeds a value representing the predetermined temperature, the transistor 37 is turned on and the communication interruption circuit 24 continues to produce a Hi level signal regardless of the output signal produced by the communication circuit 15. For this reason, the control unit 19 has the advantages (1), (2) and (4) and has the advantage that a failure in the communication system and an excessive temperature can be easily discriminated.

Further, the temperature detector may include not only a positive charaterizing thermistor 23 but also a negative characteristic thermistor. This is achieved by modifying the communication interruption circuit 24 of FIG. 5 in such that the base of the transistor 26 is connected to ground through the resistor R and is also connected to the power supply via the thermistor 23. Also in the communication interruption circuit 24 shown in FIGS. 7 and 8, the base of the transistor 37 is connected to the ground via the thermistor 23 and is connected to the power source V via the resistor R. In this case, the advantages are similar to those of the first embodiment.

Figure 9:
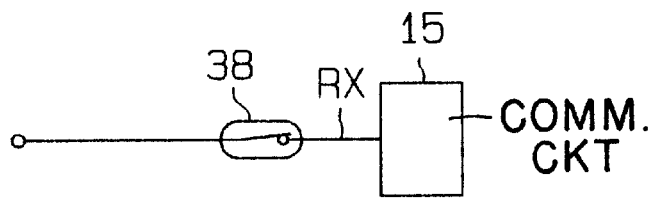
FIG. 9 is a circuit diagram of still another preferred embodiment of a communication interruption circuit.

In addition, the communication interruption circuit 24 may be modified as shown in FIG. 9 to enable detection of an excessive rise in the temperature of the power supply charging coupler without increasing the number of communication wires for interrupting the signal being transmitted to the control unit 19 from the communication circuit 15.

In such a communication interruption circuit 24, only a temperature switch 38 is connected as the temperature detector between the control unit 19 and the communication circuit 15. The temperature switch 38 may, for example, include a bimetal arranged to actuate when the temperature of the power supply coupler 200 exceeds the predetermined value, that is, when the temperature of the power supply coupler 200 increases to an excessive level. In this instance, the control unit 19 is designed to stop the supply of the electric power to the power supply coupler 200 when the output of the communication circuit 15 is off for a given time interval.

Figure 10:
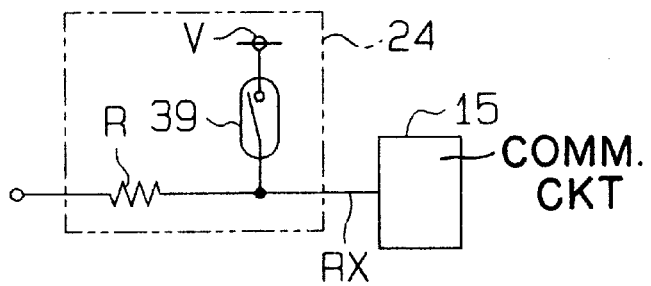
FIG. 10 is a circuit diagram of still another embodiment of a communication interruption circuit.

Further, the communication interruption circuit 24 may be modified as shown in FIG. 10. In this modification, the resistor R is connected between the control unit 19 and the communication circuit 15, and a junction between a resistor R and the communication circuit 15 is connected to the power source V via the temperature switch 39. The temperature switch 39 is turned on when temperature of the power supply coupler 200 reaches the above noted predetermined value. If the temperature of the power supply coupler 200 reaches an excessive level, the temperature switch 39 is turned on and the output signal of the communication interruption circuit 24 is held at the Hi level. It is possible for the control unit 19 to easily discriminate between a communication failure and an excessive temperature rise by arranging the communication circuit 15 to produce a low level output signal when communication is stopped by the communication circuit 15.

Figure 11:
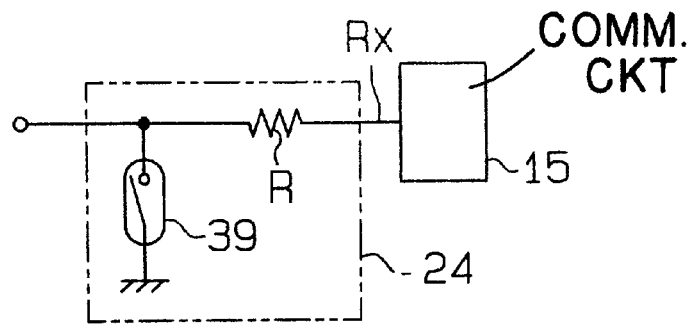
FIG. 11 is a circuit diagram of a further preferred embodiment of a communication interruption circuit.

Furthermore, the communication interruption circuit 24 may be modified as shown in FIG. 11, in which a resistor R is connected between the control unit 19 and the communication circuit 15, and the temperature switch 39 is connected between a junction between the control unit 19 and the resistor R and ground. In this case, the temperature switch 39 is of the type which is turned on when the temperature switch 39 reaches the predetermined temperature.

In this embodiment, if the temperature of the power supply coupler 200 reaches an excessive temperature, the temperature switch 39 is turned on, and the output of the transmission interruption circuit 24 goes to a Low level. Accordingly, it is possible for the control unit 19 to easily discriminate between a communication failure and an excessive temperature rise by arranging the communication circuit 15 to produce a Hi level output signal when communication is stopped by the communication circuit 15.

In the communication interruption circuits 24 shown in FIGS. 9 to 11, the MOSFET 25 and transistors 26 and 37 are omitted. These circuits are simpler in structure than those of FIGS. 5, 7 and 8.

In the communication interruption circuits that produce a signal enabling discrimination between a communication failure and an excessive temperature rise, the power supply device 400 may be modified to have an alarm device, such as a lamp or a buzzer, that is driven in response to an excessive temperature rise in the power supply charging coupler 200. With this modification, it is possible to call a person's attention in the battery charging service station when an excessive temperature rise takes place in the power supply coupler 200.

Figure 12:
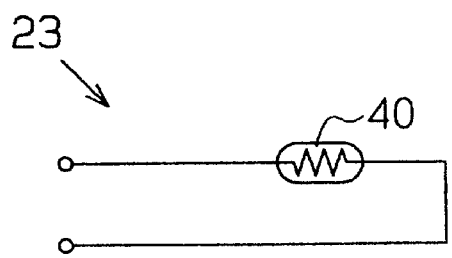
FIG. 12 is a circuit diagram of one preferred example of a temperature detector incorporated in the power supply coupler of the battery charging device according to the present invention.

Also, when the temperature detection means 23 detects that the temperature of the power supply coupler 200 exceeds the predetermined level, the detection data may be directly supplied to the control unit 19. FIG. 12 shows a circuit diagram designed to achieve this. The temperature detector 23 includes a temperature sensor 40, which is directly connected to the control unit 19 of the power supply device. The control unit 19 monitors the variations in the resistance of the temperature sensor 40 to stop the supply of the electric power to the primary coil when the detected temperature data exceeds the given level. In this case, it is easy for the control unit 19 to judge whether or not the temperature of the power supply coupler has reached the predetermined level.

Figure 13:
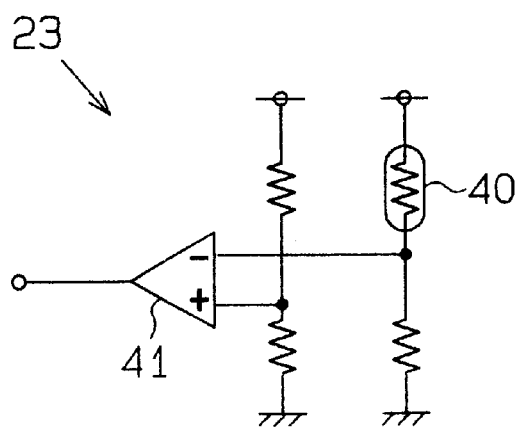
FIG. 13 is a circuit diagram of another preferred embodiment of a temperature detector.

To directly receive the temperature detection signal, the control unit 19 may be connected to another temperature detector 23, which is shown in FIG. 13. In this modification, the temperature detector 23 includes a thermistor 40 and a comparator 41. The positive terminal of the comparator 41 is connected to a source of a reference voltage to receive a reference voltage signal, and the negative terminal is connected to the thermistor 40 to receive a temperature detection signal. The comparator 41 compares the temperature detection signal and the reference voltage signal to produce an output signal, which is sent to the control unit 19.

In the temperature detector 23 of FIG. 13, the comparator 41 generates a Hi level signal when the temperature of the power supply coupler 200 exceeds the predetermined level. The comparator 41 generates a Low level signal when the temperature of the power supply coupler 200 is below the predetermined level. These output signals are supplied to the control unit 19, which can easily judge whether there has been an excessive temperature rise in the power supply coupler 200. In this embodiment, a single additional signal wire is required to supply the output signals to the control unit 19.

In addition, the power supply device 400 may include a diagnosis device, which separately stores the data indicating a communication failure and an excessive temperature rise. This arrangement makes it easy for a worker, who is in charge of repair or inspection to easily clear up the cause of the failure or the malfunction.

In the preferred embodiments discussed above, although the power supply coupler 200 and the power receiver coupler 300 employ communication units using infrared communication, these communication units may be replaced with other types of wireless communication units.

In the preferred embodiments discussed above, also, although only the power supply coupler 200 has been shown and described as having the temperature detector 23, the power receiver coupler 300 may also have the same temperature detector. With this arrangement, both of the temperature detectors prevent the power supply coupler and the power receiver coupler from overheating and permit reliable temperature management and control during the charging of the battery.

In the preferred embodiments discussed above, furthermore, although the battery charging device has been shown and described as being applied to electric vehicles, it may be also applied to other self-propelled apparatus such as a self-propelled robot powered by a battery.

What is claimed is:

1. A battery charging device comprising:
   a power supply coupler having the following components:
      a first core, a primary coil located around the first core, and a case enclosing the first core and the primary coil;
   a power receiver coupler including a second core for forming a magnetic path with said first core, a secondary coil located around the second core, and a case enclosing the second core and the secondary coil;
   a power supply device connected to the primary coil;
   a battery connected to the secondary coil, wherein the battery is charged by an inductive current generated in the secondary coil when electric power is supplied to the primary core by the power supply device; and
   a temperature detector for detecting the temperature of the power supply coupler and for generating an electric signal for use in preventing the temperature of the components from exceeding a predetermined level.

2. A battery charging deice according to claim 1, wherein the power supply device includes a control unit for controlling the level of the electric power supplied to the primary coil, wherein the power supply coupler includes a communication unit for transmitting a signal, which carries information that the control unit uses to control the electric power, to the control unit, and a communication interruption circuit to interrupt the signal when the temperature detector indicates that the power supply coupler has reached the predetermined level.

3. A battery charging device according to claim 2, wherein the communication interruption circuit includes a temperature switch, which is turned off when the temperature of the power supply coupler exceeds the predetermined level.

4. A battery charging device according to claim 2, wherein the communication interruption circuit outputs a first signal to the control unit when the temperature of the power supply coupler is below the predetermined level and a second signal, which is different from the first signal, when the temperature of the power supply coupler exceeds the predetermined level.

5. A battery charging device according to claim 1, wherein the temperature detector is connected to the control unit, and wherein the power supply device includes a control unit for controlling the electric power supplied to the primary coil in response to the first and second signals generated by the temperature detector.

6. A battery charging device comprising:
   a power supply coupler having the following components:
     a first core, a primary coil located around the first core, and a case the first core and the primary coil;
   a power receiver coupler including a second core for forming a magnetic path with the first core, a secondary coil located around the first core, and a case enclosing the second core and the secondary coil;
   a power supply device for supplying an electric power to the primary coil;
   a battery connected to the secondary coil, wherein the battery is charged by an inductive current generated in the secondary coil when electric power is supplied to the secondary coil from the power supply device;
   a first communicating unit in the power receiver coupler for transmitting a first electric signal, which carries information related to the condition of the battery, to the power supply coupler;
   a second communication unit in the power supply coupler, wherein the second communication unit responds to the first electric signal by transmitting the first electric signal as a second electric signal to the power supply device;
   a temperature detector located in the power supply coupler for generating a third electric signal, wherein the third electric signal indicates whether a temperature in the power supply coupler has reached a predetermined value;
   a communication interruption circuit connected to the temperature detector to receive the third electric signal, wherein the third electric signal interrupts the second electric signal when the temperature exceeds the predetermined value; and
   a control unit in the power supply unit for controlling the electric power supplied to the primary coil in response to the second electric signal.

7. A battery charging device according to claim 6, wherein the communication interruption circuit includes a temperature switch, which is turned off when the temperature of the power supply coupler exceeds the predetermined temperature value.

8. A battery charging device according to claim 6, wherein the first communication unit, the second communication unit and the control unit communicate with each other with a digital signal, and wherein the communication interruption circuit continues to transmit the second electric signal to the control unit if the second electric signal is supplied to the control unit by the second communication unit when the temperature of the power supply coupler is below the predetermined value, and the communication interruption circuit continuously outputs a Low level signal to the control unit if the second electric signal is not supplied to the control unit from the second communication unit, and when the third electric signal indicates that temperature exceeds the predetermined value, the second communication unit continues to output a Hi level signal to the control unit, and the control unit interrupts the supply of electric power to the primary coil in response to the Hi level signal.

9. A battery charging device according to claim 6, wherein the first communication unit, the second communication unit and the control unit communicates with each other via a digital signal, and wherein the communication interruption circuit continues to output the second signal to the control unit when the second control signal is transmitted to the control unit from the second communication unit, and the communication interruption circuit continuously outputs the Hi level signal to the control unit when the second electric signal is not transmitted to the control unit from the second communication unit, and when the third electric signal indicates that the temperature exceeds the predetermined value, the second communication unit continues to the Hi level signal and the control unit interrupts the supply of electric power to the primary coil.

10. A power supply coupler for the battery charging device having a temperature detector for detecting the temperature of the inside of the power supply coupler and for generating an electric signal when the temperature of the inside of the power supply coupler exceeds a predetermined level.

11. A power supply coupler for a battery charging device, the power supply coupler being connected to a power supply device, which has a control unit for controlling a supply of electric power to the power supply coupler, wherein the battery charging device has a power receiver coupler that includes a first core and a secondary coil located around the first core, the power supply coupler comprising:
   a second core that forms a magnetic path with the first core when the power supply coupler is inserted into the power receiver coupler;
   a primary core located around the second core and connected to the power supply device to receive the electric power;
   a temperature detector for detecting a temperature of said power supply coupler and for producing an output signal when the temperature exceeds a predetermined value, which causes the control unit to stop the supply of electric power for preventing an excessive temperature rise beyond the predetermined value in the power supply coupler; and
   a case enclosing the second core, the primary core and the temperature detection means.

12. A power supply coupler according to claim 11, wherein the power supply coupler further comprises a communication unit for transmitting an electric signal, which caries information used by the control unit, to the control unit, and a communication interruption circuit for interrupting the electric signal when the predetermined temperature value is detected by the temperature detector.

* * * * *